United States Patent
Kotani

(10) Patent No.: US 7,788,304 B2
(45) Date of Patent: Aug. 31, 2010

(54) OBJECT MANAGEMENT USING A PLURALITY OF DIRECTORIES IN RECORDING APPARATUS

(75) Inventor: Takuya Kotani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 662 days.

(21) Appl. No.: 10/856,802

(22) Filed: Jun. 1, 2004

(65) Prior Publication Data

US 2004/0249844 A1    Dec. 9, 2004

(30) Foreign Application Priority Data

Jun. 3, 2003    (JP)    .............................. 2003-158599

(51) Int. Cl.
*G06F 7/00*    (2006.01)
*G06F 17/00*    (2006.01)
*G06F 9/44*    (2006.01)
(52) U.S. Cl. ...................... 707/829; 717/100
(58) Field of Classification Search ................ 707/100, 707/104.1, 202; 386/95
See application file for complete search history.

(56) References Cited

U.S. PATENT DOCUMENTS

| 68,487 | A | * | 9/1867 | Barton et al. .............. 33/561.3 |
|---|---|---|---|---|
| 107,223 | A | * | 9/1870 | Uno et al .................... 76/104.1 |
| 6,266,483 | B1 | | 7/2001 | Okada et al. ................. 386/128 |
| 6,388,961 | B1 | * | 5/2002 | Ijichi ........................ 369/30.36 |
| 6,920,466 | B2 | * | 7/2005 | Kudo ........................ 707/200 |
| 7,003,533 | B2 | * | 2/2006 | Noguchi et al. ............. 707/203 |
| 2002/0062320 | A1 | * | 5/2002 | Shimojima et al. ....... 707/104.1 |
| 2003/0204522 | A1 | * | 10/2003 | Gallagher et al. ........... 707/102 |
| 2005/0108466 | A1 | * | 5/2005 | Takashima et al. .......... 711/100 |
| 2006/0053153 | A1 | * | 3/2006 | Takeshima et al. .......... 707/102 |

FOREIGN PATENT DOCUMENTS

JP    2003-150611    5/2003

OTHER PUBLICATIONS

Japanese Office Action dated May 22, 2009, from corresponding Japanese Application No. 2003-158599.

* cited by examiner

*Primary Examiner*—Neveen Abel Jalil
*Assistant Examiner*—Raheem Hoffler
(74) *Attorney, Agent, or Firm*—Fitzpatrick, Cella, Harper & Scinto

(57) ABSTRACT

Provided is a recording apparatus which records a plurality of object files each containing object data on a recording medium. The recording apparatus generates an object management file containing identification information of the object files, classifies the plurality of object files into a plurality of groups, generates group management files each containing entries designating files in the corresponding group with the identification information, and records the object management file and group management files on the recording medium.

7 Claims, 15 Drawing Sheets

[MEDIA] :: = ( "MOV" | "IMG" | "AUD" | "PLF" )

FIG. 4

```
<COLLECTION>
<MOV src="MOV_0001.MPG" id="MOV_0001" type="movie" dur="00:10.05" PLF_linkCount="2">
    <MRK ICON="THM_0001.THM" IN="10s" DUR="20s" />
</MOV>
<MOV src="MOV_0002.MPG" id="MOV_0002" type="movie" dur="00:07.15"/>
</COLLECTION>
```

FIG. 5

```
<smil>
 <body>
  <par>
   <seq>
    <video src=' /VIDEO/MOV00010/MOV00010.4C#xpointer(//MOV[@id="MOV_0001"])' />
    <video src=' /VIDEO/MOV00020/MOV00020.4C#xpointer(//MOV[@id="MOV_0001"])' />
   </seq>
   <seq>
    <audio src=' /AUDIO/AUD00010/AUD00010.4C#xpointer(//AUD[@id="AUD_0001"])' />
   </seq>
  </par>
 </body>
</smil>
```

FIG. 14

```
<COLLECTION VOLUME_ID="XXXX XXXX XXXX XXXX XXXX XXXX XXXX XXXX"
    CREATE_DATE="2002-04-10T11:27:04"
    MODIFY_DATE="2002-04-10T11:27:04"
    TITLE="Sample of Contents Management File >
<METADATA>
    <d35:CONTENT_DESCRIPTION>
    </d35:CONTENT_DESCRIPTION>
</METADATA>
<MOV src' /VIDEO/MOV00020/MOV00020.4C#xpointer(//MOV[@id="MOV_0001"] ) ' />
</COLLECTION>
```

FIG. 15

```
<COLLECTION>
  <GROUP ID="DATE020510"
    GROUP_TYPE"DATE"
    CREATE_DATE"2002-05-01T13:12:34"
    MODIFY_DATE"2002-05-01T13:13:12"
    ICON="/Video/MOV00000/MOV00000.THM"
    TITLE="Sample of Date Group">
    <MOV ID="0001"
      SRC="/Video/MOV00000/MOV00000.4C#xpointer( id( 'MOV00000') ) " />
    <IMG ID="0002"
      SRC="/DCIM/101GANON.4C#xpointer( id( 'IMG_0001') ) " />
  </GROUP>
</COLLECTION>
```

OBJECT MANAGEMENT USING A PLURALITY OF DIRECTORIES IN RECORDING APPARATUS

FIELD OF THE INVENTION

The present invention relates to a recording apparatus which efficiently manages a target object.

BACKGROUND OF THE INVENTION

Nowadays, data storage media of digital cameras and digital disk cameras have enormously increased capacities, and it has become possible to record various data files of movie data, audio data, still image data, and the like in a randomly accessible storage media such as a CompactFlash (registered trademark), MO disk, and the like. A digital disk camera can easily photograph still images and moving images, and thus the amount of photographed data has dramatically increased, as compared to a conventional use of films.

It is, however, difficult to manage a large number of data files. For this reason, attempts have been made to increase the searchability of data files by automatically grouping the data files or grouping the user's favorite ones. There has also been provided a nondestructive movie edit function which exploits data random accessibility and uses a reproduction control script (e.g., U.S. Pat. No. 6,266,483).

As described above, data stored in a recording medium is sometimes grouped or referred to by a reproduction control script. The data does not exist alone but coexists with other information. To delete a file, groups and reference from the reproduction control script always need to be managed. However, it is difficult to completely manage a large number of files and their referential relationships.

For example, assume that a certain file is directly referred to from a management file or a reproduction control script. To change the file name of the referred file, the contents of all management files and reproduction control scripts that refer to the file must be updated.

SUMMARY OF THE INVENTION

The present invention has been made in consideration of the above situation, and has its object to localize and reduce the file management cost and diversify the risk of corruption of management files.

According to the present invention, the foregoing object is attained by providing a recording apparatus that records on a recording medium a plurality of object files each containing object data, comprising: a management information processing unit that generates an object management file containing identification information of the object files, classifies the plurality of object files into a plurality of groups, and generates group management files each containing entries designating files in the corresponding group with the identification information; and a recording unit that records the object management file and group management files on the recording medium.

According to the present invention, the foregoing object is also attained by providing a recording apparatus that records on a recording medium a plurality of object files each containing object data, comprising: a management information processing unit that generates an object management file containing identification information of the object files and generates a recording medium management file containing reproduction start file information designating a file from which reproduction is to be started out of the plurality of object files recorded on the recording medium with the identification information; and a recording unit that records the object management file and recording medium management file on the recording medium.

According to the present invention, the foregoing object is also attained by providing a recording apparatus that records on a recording medium an object file containing object data, comprising: a management file processing unit that generates an object management file containing reproduction start point information indicating a reproduction start point of the object data for each of directories on the recording medium in which the object file is stored; and a recording unit that records the object file and object management file on the recording medium.

According to the present invention, the foregoing object is also attained by providing a recording apparatus that records on a recording medium an object file containing object data, comprising: a management file processing unit that generates an object management file containing printing target information indicating that the object data is targeted for printing for each of directories on the recording medium on which the object file is stored; and a recording unit that records the object file and object management file on the recording medium.

According to the present invention, the foregoing object is also attained by providing a recording apparatus that records on a recording medium an object file containing object data, comprising: a management file processing unit that generates an object management file containing printing count information indicating the number of times the object data is printed for each of directories on the recording medium on which the object file is stored; and a recording unit that records the object file and object management file on the recording medium.

According to the present invention, the foregoing object is also attained by providing a recording apparatus that records on a recording medium an object file containing object data, comprising: a management file processing unit that generates an object management file on the object file for each of directories on the recording medium; and a recording unit that records the object file and object management file for the object file in identical directory to record the files on the recording medium.

According to the present invention, the foregoing object is also attained by providing a recording method of recording on a recording medium a plurality of object files each containing object data, comprising: generating an object management file containing identification information of the object files; classifying the plurality of object files into a plurality of groups; generating group management files each containing entries designating files in the corresponding group with the identification information; and recording the object management file and group management files on the recording medium.

According to the present invention, the foregoing object is also attained by providing a recording method of recording on a recording medium a plurality of object files each containing object data, comprising: generating an object management file containing identification information of the object files; generating a recording medium management file containing reproduction start file information designating a file from which reproduction is to be started out of the plurality of object files recorded on the recording medium with the identification information; and recording the object management file and recording medium management file on the recording medium.

According to the present invention, the foregoing object is also attained by providing a recording method of recording on a recording medium an object file containing object data, comprising: generating an object management file containing reproduction start point information indicating a reproduction start point of the object data for each of directories on the recording medium in which the object file is stored; and recording the object file and object management file on the recording medium.

According to the present invention, the foregoing object is also attained by providing a recording method of recording on a recording medium an object file containing object data, comprising: generating an object management file containing printing target information indicating that the object data is targeted for printing for each of directories on the recording medium on which the object file is stored; and recording the object file and object management file on the recording medium.

According to the present invention, the foregoing object is also attained by providing a recording method of recording on a recording medium an object file containing object data, comprising: generating an object management file containing printing count information indicating the number of times the object data is printed for each of directories on the recording medium on which the object file is stored; and recording the object file and object management file on the recording medium.

According to the present invention, the foregoing object is also attained by providing a recording method of recording on a recording medium an object file containing object data, comprising: generating an object management file on the object file for each of directories on the recording medium; and recording the object file and object management file for the object file in identical directory to record the files on the recording medium.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 shows a description example of a directory management file according to the first embodiment of the present invention;

FIG. 5 shows a description example of a play list according to the first embodiment of the present invention;

FIG. 14 shows a description example of a recording medium management file according to the first embodiment of the present invention; and FIG. 15 shows a description example of group management files according to the first embodiment of the present invention.

DETAILED DESCRIPTION OF THE PREFERRED EMBODIMENTS

Preferred embodiments of the present invention will be described in detail in accordance with the accompanying drawings.

First Embodiment

Figure 1:
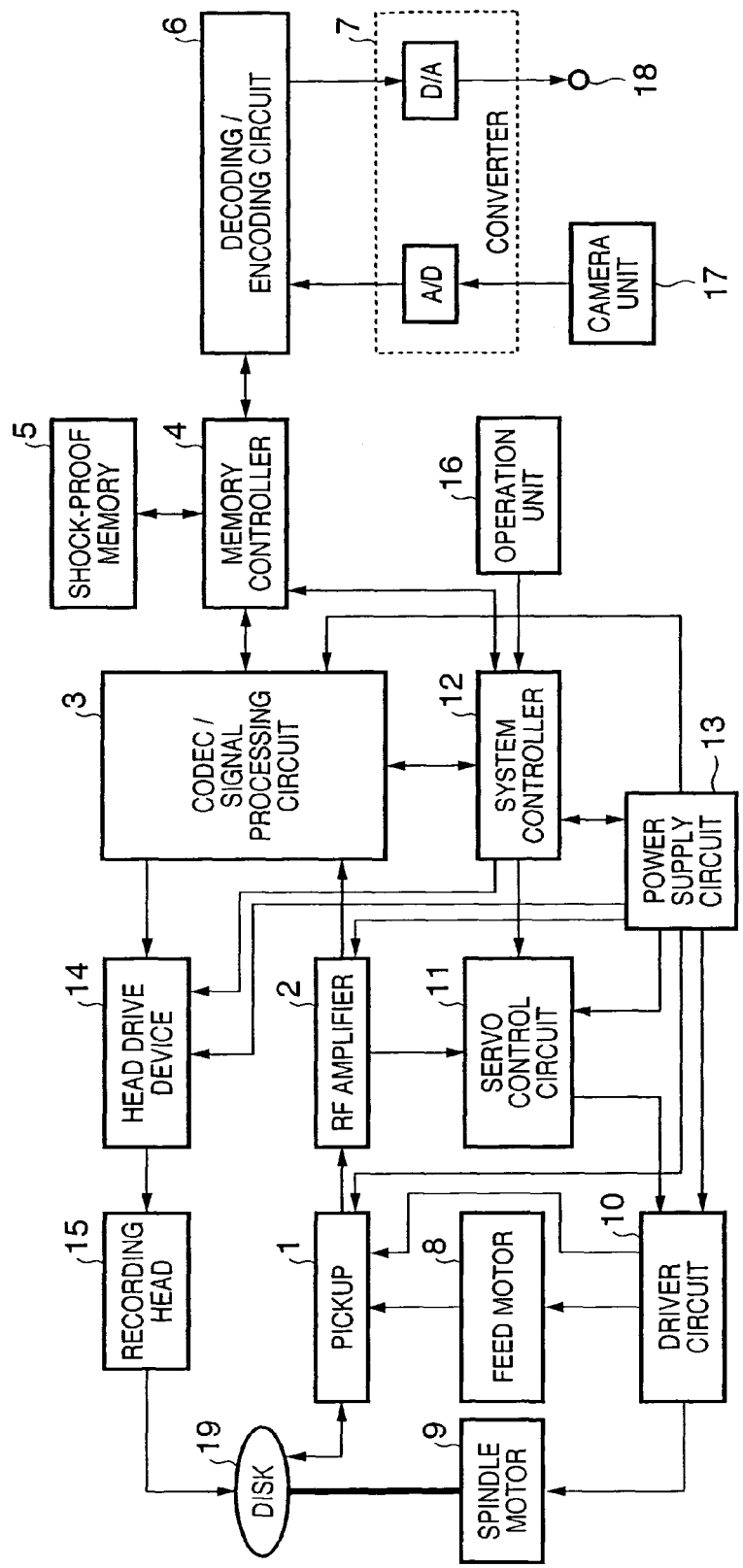
FIG. 1 is a block diagram showing the arrangement of an information recording/reproducing apparatus according to a first embodiment of the present invention.

An example of an apparatus according to the first embodiment of the present invention will be described with reference to FIG. 1. A video camera serving as an information recording/reproducing apparatus according to the first embodiment mainly comprises a disk 19 as a recording medium, a pickup 1 which writes/reads out media data such as movie data, still image data, and audio data on/from the disk 19, a radio frequency (RF) amplifier 2 which amplifies a readout signal, a codec/signal processing circuit 3, a shock-proof memory 5 which temporarily stores data, a memory controller 4 which controls the shock-proof memory 5, a decoding/encoding circuit 6, a converter 7 made up of a D/A converter and A/D converter, a feed motor 8, a spindle motor 9, a driver circuit 10, a servo control circuit 11, a system controller 12 which makes various kinds of control, a power supply circuit 13, a head drive device 14, a recording head 15, an operation unit 16, a camera unit 17, and a video/audio output terminal 18. Note that the disk 19 adopts, e.g., a magnetooptical disk (to be referred to as an MO hereinafter) in this embodiment. However, the disk 19 is not limited to an MO.

According to the above-mentioned arrangement, in a reproduction mode, the MO 19 is rotatably driven by the spindle motor 9 driven by the driver circuit 10, and the pickup 1 is fed in the radial direction of the disk 19 by the feed motor 8 driven by the driver circuit 10. Data read out by this pickup 1 is amplified by the RF amplifier 2, and the amplified data is output to the codec/signal processing circuit 3.

The RF amplifier 2 generates servo control signals such as a focus error signal, tracking error signal, and the like on the basis of the readout data, and outputs these signals to the servo control circuit 11. The servo control circuit 11 drives the pickup 1, feed motor 8, and spindle motor 9 on the basis of a servo control signal from the RF amplifier 2 and a control signal from the system controller 12.

The codec/signal processing circuit 3 demodulates the signal amplified by the RF amplifier 2, applies processes such as error correction and the like to the demodulated signal, and sends the processed signal to the memory controller 4. The memory controller 4 writes the signal output from the codec/signal processing circuit 3 on the shock-proof memory 5. In the shock-proof memory 5, an area for storing TOC (Table Of Contents) information other than media data is reserved in addition to a media data storage area. When the MO 19 is inserted into the apparatus, TOC information stored in the MO 19 follows the same route as media data and is stored in a predetermined area on the shock-proof memory 5.

The memory controller 4 reads out required TOC information from the shock-proof memory 5 in response to a request from the system controller 12, and sends the readout TOC information to the system controller 12. The system controller 12 reads out data stored in the shock-proof memory 5, and sends the readout data to the decoding/encoding circuit 6. The decoding/encoding circuit 6 decodes the sent data in accordance with a predetermined format using a data decoding circuit (not shown) and sends the decoded data to the D/A converter in the converter 7. The D/A converter converts the decoded media data into an analog signal. This analog signal is externally output via the output terminal 18.

The system controller 12 controls the power supply circuit 13 to start/stop power supply to the pickup 1, RF amplifier 2, codec/signal processing circuit 3, servo control circuit 11, and driver circuit 10.

The operation unit 16 has a pause button, play button, play/record mode select switch, image select cursor keys, and the like.

In a recording mode, an analog video/audio signal input from the camera unit 17 is sent to the A/D converter in the converter 7. The A/D converter converts the analog video/audio signal into a digital signal. This digital signal is encoded to a predetermined format by a data encoding circuit (not shown) in the decoding/encoding circuit 6, and the encoded signal is stored in the shock-proof memory 5 by the memory controller 4. The memory controller 4 reads out data stored in the shock-proof memory 5 and sends the readout data to the codec/signal processing circuit 3 under the control of the system controller 12. The codec/signal processing circuit 3 modulates the readout data, appends an error correction code to the modulated data, and so forth.

The system controller 12 controls the memory controller 4 to read out TOC information stored in the predetermined area of the shock-proof memory 5, recognizes the location of a recordable area on the MO 19 on the basis of this TOC information, and controls the servo control circuit 11 to search for a desired recordable area. After the search, the head drive device 14 drives the recording head 15 on the basis of the output signal from the codec recording/reproduction processing circuit 3, and a laser circuit (not shown) of the pickup 1 is driven on the basis of the output signal from the RF amplifier 2 under the control of the system controller 12, thus recording data on the MO 19.

Upon completion of the recording operation on the desired recordable area, the system controller 12 controls the memory controller 4 to rewrite the TOC information in the MO 19 and that stored in the shock-proof memory 5, and uses the rewritten information as the latest TOC information to manage data recorded on the MO 19 and the like.

Details for implementing the information recording/reproducing apparatus according to the present invention in a video camcorder will be described below. First, the formats of data to be handled, and the processing method of these data will be described in turn.

1. Format of Objective Data

Data handled by an information recording/reproducing apparatus according to the present invention, and their data formats will be explained. The types of data to be recorded by the video camcorder will be explained first, and details of a directory structure used to store the data, management file, and play list will be described in turn.

The information recording/reproducing apparatus according to the present invention does not directly refer to an objective file and a directory management file which performs file management on a directory-by-directory basis. The information recording/reproducing apparatus is characterized by file grouping implemented by referring to entries of the directory management file and a reproduction control file (play list).

Data to be Recorded by Video Camera

Data to be recorded by the video camera includes movie data, still image data, and audio data. Also, the video camera has a function of generating a reproduction control script (to be referred to as a play list hereinafter) used to reproduce movie data, still image data, and audio data in combination. Details of the play list will be described later.

Movie data is encoded and recorded in a format according to MPEG2. As data formats, PS (Program Stream) and TS (Transport Stream) formats are available, and one of these formats used to save data can be determined from a menu of the apparatus.

Audio data is recorded in an MP3 (MPEG Audio Layer3) format.

Still image data is recorded in a format compatible to DCF (Design rule for Camera File system).

To manage these data, a storage medium management file, a directory management file, and a group management file which contains data grouping information are prepared. These management files will be described later in detail.

Data Storage Method

Figure 2:
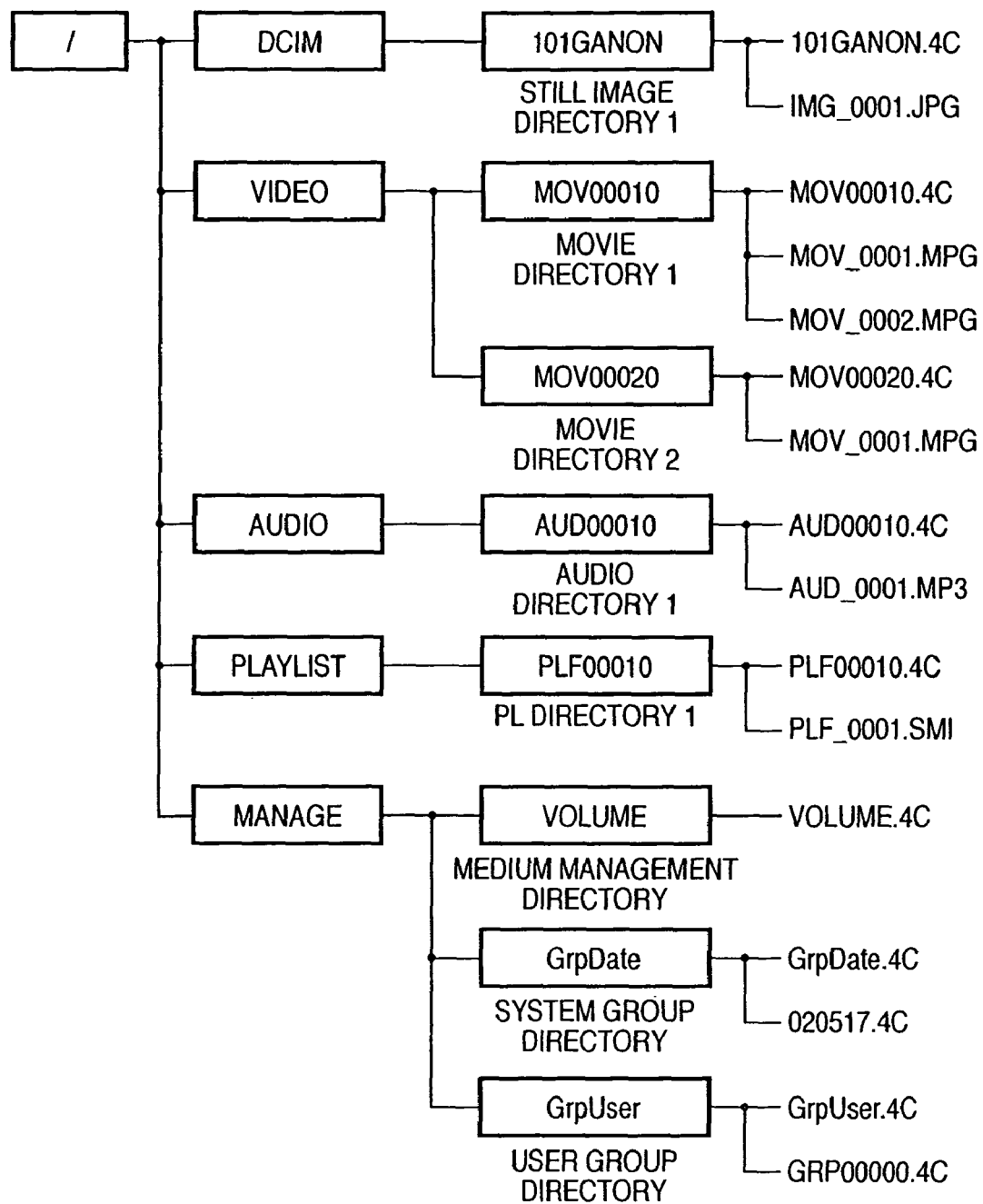
FIG. 2 is a diagram showing the data storage method of a recording medium according to the first embodiment of the present invention.

FIG. 2 shows an example of the storage state of movie data, audio data, still image data, a play list, and management files in the recording medium. Movie data, audio data, and still image data recorded by the information recording/reproducing apparatus according to the present invention will generically be referred to as media objects. Files with an extension "0.4C" are management files to be described later.

A play list is stored in a PLAYLIST directory created immediately under the root directory on the recording medium. A PL directory that stores a play list is created under the PLAYLIST directory, and stores a play list file (PLF) in the PL directory.

Movie data is stored in a VIDEO directory created immediately under the root directory of the recording medium. Movie directories that store movie data are created under the VIDEO directory, and store movie data.

In the first embodiment, one movie directory stores one or more movie data. A method of storing a group of a plurality of movie data in one movie directory will be described later.

Audio data is recorded in the same manner as movie data. The number of audio data files on the recording medium is expected to be relatively small. Hence, in this embodiment, 100 audio data files are stored together in one audio directory. The audio directory is created under an AUDIO directory created immediately under the root directory of the recording medium.

Still image data is stored in a DCIM directory created immediately under the root directory of the recording medium, as specified by DCF. A still image data file is actually stored in a still image directory created under the DCIM directory.

The PL, movie, audio, and still image directories respectively store directory management files used to manage files stored in those directories.

Management files other than the directory management files are placed in directories under a MANAGE directory created immediately under the root directory. A recording medium management file is stored in a predetermined directory such as a VOLUME directory in the first embodiment. A group management file stores groups automatically created by the system in a GrpDate directory while a group management file stores groups created by the user in a GrpUser directory. Directory management files are placed also in the GrpDate and GrpUser directories, respectively.

In recording movie data, audio data, or still image data to be reproduced, the information recording/reproducing apparatus according to the first embodiment performs automatic grouping in accordance with the recording date. Hence, the system automatically creates groups in accordance with this recording date, and the directory which stores the group management file for the groups is named GrpDate.

Basic Format of Management File

To explain the management files in detail, their formats will be described first. Then, details of the directory management files, recording medium management file, and group management files will be described.

Figure 3:
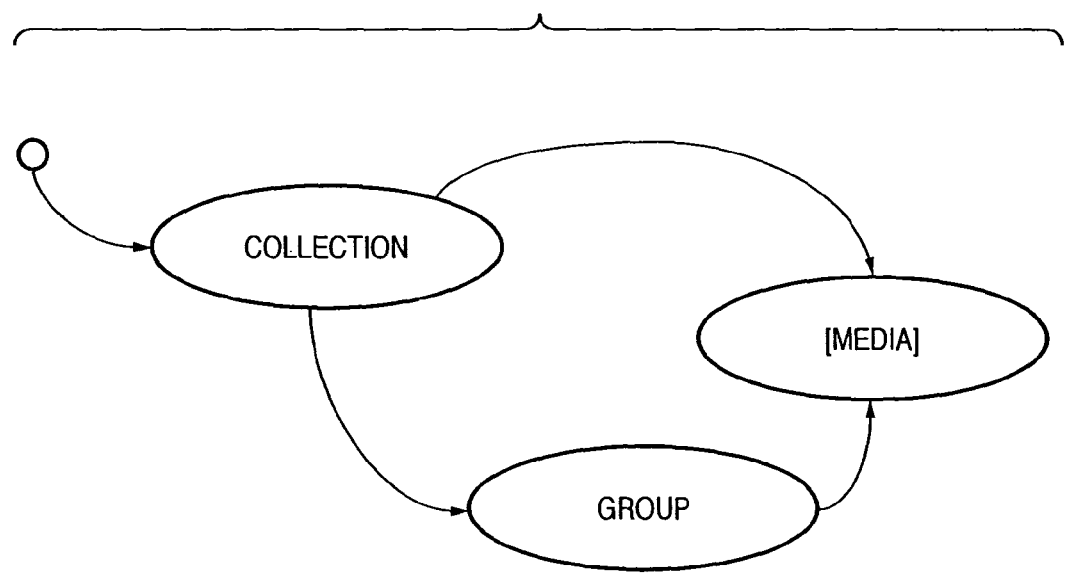
FIG. 3 is a diagram showing the basic structure of a management file according to the first embodiment of the present invention.

Each management file is a text file described in an XML format. FIG. 3 shows the element configuration of an XML document that forms the management file. FIG. 4 shows a description example of the directory management file in a movie directory MOV00010 shown in FIG. 2.

Referring to FIG. 3, a COLLECTION element is a route element of management information.

A GROUP element is used to group media objects such as movie data, still image data, audio data, and the like. The GROUP element has a GROUP_NAME attribute. The GROUP_NAME attribute is used to describe a group name.

An IMG element in [MEDIA] is used to describe entries of still image data. The IMG element has a src attribute, id attribute, type attribute, linkCount attribute, and deleted attribute. The src attribute is used to describe a file name. The id attribute is used to describe the identification name of a file. The identification name designated by the id attribute must be unique in the management file. For example, in the first embodiment, a string of hexadecimal characters representing the UUID (Universal Unique ID) of an objective file is set as the id attribute. The type attribute represents the type of file, and assumes a value "image" in case of a still image. The IMG element also has a printCount attribute to hold the number of times that the image is printed. This embodiment has the print count but may have an alreadyPrint attribute which indicates whether the image has been printed. The value of the alreadyPrint attribute is true or false.

The linkCount attribute has three types, i.e., a PLF_linkCount attribute, SYSTEM_linkCount attribute, and USER_linkCount attribute. They indicate the number of links to entries from the PLF, the number of links to entries from the groups automatically created by the system, and the number of links to entries from the groups voluntarily created by the user, respectively. Accordingly, these attribute values are integer values. The deleted attribute is deletion information, and its attribute value is true or false. When a file is deleted while the linkCount attribute value is nonzero, the deleted attribute value is set to be true.

A MOV element in [MEDIA] is used to describe entries of movie data. The MOV element has a src attribute, id attribute, type attribute, linkCount attribute, and deleted attribute as in the IMG element, and also has a dur attribute. In case of a movie, the type attribute value is "movie". The dur attribute describes the reproduction duration of the entire movie data, and assumes a clock value. The clock value (Clock-value) is expressed in the following format:

Clock-value::=(Full-clock-value|Partial-clock-value|Timecount-value)

Full-clock-value::=Hours ":" Minutes ":" "Seconds" ("."Fraction)?

Partial-clock-value::=Minutes ":" "Seconds" ("." Fraction)?

Timecount-value::=Timecount ("." Fraction)?(Metric)?

Hours::=DIGIT+; any positive number

Minutes::=2DIGIT; range from 00 to 59

Seconds::=2DIGIT; range from 00 to 59

Fraction::=DIGIT+

Timecount::=DIGIT+

2DIGIT::=DIGIT DIGIT

DIGIT::=[0-9]

For example, 14 minutes 3 seconds are described as "00:14:03" or "14:03".

An AUD element in [MEDIA] is used to describe entries of audio data. The AUD element has a src attribute, id attribute, type attribute, linkCount attribute, deleted attribute, and dur attribute as in the MOV element. In case of audio, the type attribute value is "audio".

A PLF element in [MEDIA] is used to describe PLF entries. The PLF element has a src attribute, id attribute, type attribute, linkCount attribute, deleted attribute, and dur attribute as in the MOV element. Since a PLF itself may be referred to from other play lists, the linkCount attribute and deleted attribute are prepared in the PLF element. In case of PLF, the type attribute value is "playlist".

The MOV, AUD, IMG, and PLF elements can have an MRK element as a child. The MRK element is a tag which designates the position and range in the reproduction duration of a media object as a parent element.

For example, reproduction of a certain object file is paused or stopped during a reproduction period, information of the stop position is described as the MRK element. Reproduction can be started the next time from the reproduction stop position using the recording medium management file, as will be described later.

The MRK element can have a SRC attribute, IN attribute, DUR attribute, and AUTO attribute. The SRC attribute can designate the file name of a thumbnail image file corresponding to the target position; the IN attribute, a designated position; and the DUR attribute, a range. The IN attribute is expressed in the same format as a begin attribute of SMIL2.0 while the DUR attribute is expressed in the same format as the clock value. The AUTO attribute value is true or false. If the value is true, the object file is one targeted for automatic start reproduction, and a combination of the IN and DUR attributes represents a reproduction range. If the IN attribute is omitted, the position is the top position of data. On the other hand, if the DUR attribute is omitted, the range covers the entire data.

Generally, if reproduction is stopped during a reproduction period, only the IN attribute value is described, and the AUTO attribute value is set to be true.

If a MARK attribute is used as a bookmark, the user can mark any position of an object file and can designate the reproduction range and whether to perform automatic reproduction.

To designate a portion of a movie file "MOV_0001.MPG" beginning at a 10-sec point as a start point from the top position for a duration of 20 sec using this MRK element, the description is as follows:

<MOV SRC="MOV_0001.MPG . . . >
        <MRK SRC="THM_0001.THM" IN="10s" DUR="20s"
           AUTO="true"/>
    </MOV>

In this example, the AUTO attribute is true. If the movie file "MOV_0001.MPG" is targeted for autorun reproduction, a portion designated by the MRK element is automatically reproduced after setting up a recording medium. Setting up a recording medium means a sequence from when the recording medium is inserted into a drive to when the recording medium becomes readable if the recording medium is an MO.

For this purpose, a file to be automatically reproduced is designated in the recording medium management file, as will be described later.

If the AUTO attribute value is false, the object file is reproduced from the top position.

Also, an ICON element can be placed at the same position as the MRK element. The ICON element has a SRC attribute and the SRC attribute can associate an image representative of a corresponding media object with the ICON element. Accordingly, the ICON element has neither an IN attribute nor DUR attribute, unlike the MRK element.

This embodiment has explained a bookmark function of the MRK element and a representative image designation function of the ICON element as additional information of a media object. A file containing a reproduction time map table and further additional information may be referred to in the same manner. To represent this further additional information, metadata defined by MPEG7, DIG35, or the like may be held as a separate file and may be referred to from the entries of a media object file.

Details of the directory management files, recording medium management file, and group management files will be described.

Directory Management File

Each directory management file is the management information file of a directory, such as a movie directory or audio directory, which stores media objects to be reproduced (FIG. 4). Data constituting the directory management file is formed by enclosing between the COLLECTION elements an element which indicates a list of files to be stored in the directory.

Recording Medium Management File

The recording medium management file is a management information file which stores the identification information of a recording medium. FIG. 14 shows an example of the recording medium management file.

The COLLECTION element has a VOLUME_ID attribute as the identification ID of a recording medium. The VOLUME_ID attribute value is a text string of hexadecimal characters representing the UUID. A CREATE_DATE attribute indicates the initialization date of the recording medium, and a MODIFY_DATE attribute indicates the latest update date and time of data recorded on the recording medium. A TITLE attribute can title the recording medium. The COLLECTION element also has a WRITE_PROTECT attribute. If the attribute value is true, the recording medium is designated as write-protect. Thus, files other than the recording medium management file on the recording medium are not rewritten.

A media object to be reproduced or a play list file can be registered as a child of the COLLECTION element in the recording medium management file. A registered file is automatically reproduced after setting up the recording medium.

For example, if reproduction is stopped during a reproduction period, as described above, a file having been reproduced can automatically be reproduced from the reproduction stop position by describing the name of the file in the recording medium management file.

If the names of a plurality of files are described in the recording medium management file, the files are reproduced in the order of description. A file is designated by a file value. The file value (file-value) is expressed by:

file-value::=Manage-filename "#xpointer(//"
    Element-name "[id=" Object-id "])" where "Manage-filename" is the name of the directory management file of a directory that stores an objective file. "Element-name" is the element name of an objective entry, and it is MOV in case of movie data. "Object-id" is the id attribute value appended to the entry of objective data. In this way, a file name is designated by referring to an entry in the corresponding directory management file. Management of each file is localized in management using the directory management files, and the recording medium management file need not manage the files themselves.

The group management files or play list adopts a similar reference method, which can greatly reduce the management cost of files recorded on a recording medium. This file reference description method complies with an Xpath/XPointer format defined by W3C and is versatile.

With this reference method, for example, even when one file is referred to from all of the recording medium management file, group management files, and play list file, in changing the name of the file, the content of the corresponding directory management file only need to be updated. Assume that each of the management files and play list directly refers to the name of a file without this reference method. In this case, to change the file name, all the management files and play list must be scanned, and all entries that refer to the file must be updated.

Having a metadata description in XML typified by DIG35 or the like under a METADATA element set as a child of the COLLECTION element makes it possible to hold more detailed recording medium information.

Group Management File

Each group management file is used to group media objects. The group management file describes a list of files by arranging a GROUP element under the COLLECTION element and arranging entries of media objects to be grouped as children of the GROUP element. FIG. 15 shows a description example. FIG. 15 shows a description example in which two files of a movie file and still image file are grouped.

Each GROUP element has a GROUP_TYPE attribute. Whether the group is automatically created or voluntarily created by the user is determined from this attribute. The GROUP element also has a CREATE_DATE attribute and MODIFY_DATE attribute. These attributes are used to hold the creation date and time and update date and time, respectively, of the group. An ICON attribute can hold an image representative of the group, and the TITLE attribute can hold a group title. The names of files to be grouped are indirectly referred to using directory management files in the same manner as the recording medium management file. Thus, the file names are referred to by file values.

Play List

The play list is described in a format complying with SMIL. Note that the src attribute used to designate the file name of a reproduction object assumes a file value. In this way, since links from the play list to respective files are defined via id attribute values, even when a given file name has been changed, only the src attribute value in an entry of the aforementioned management file needs to be changed.

Figure 6:
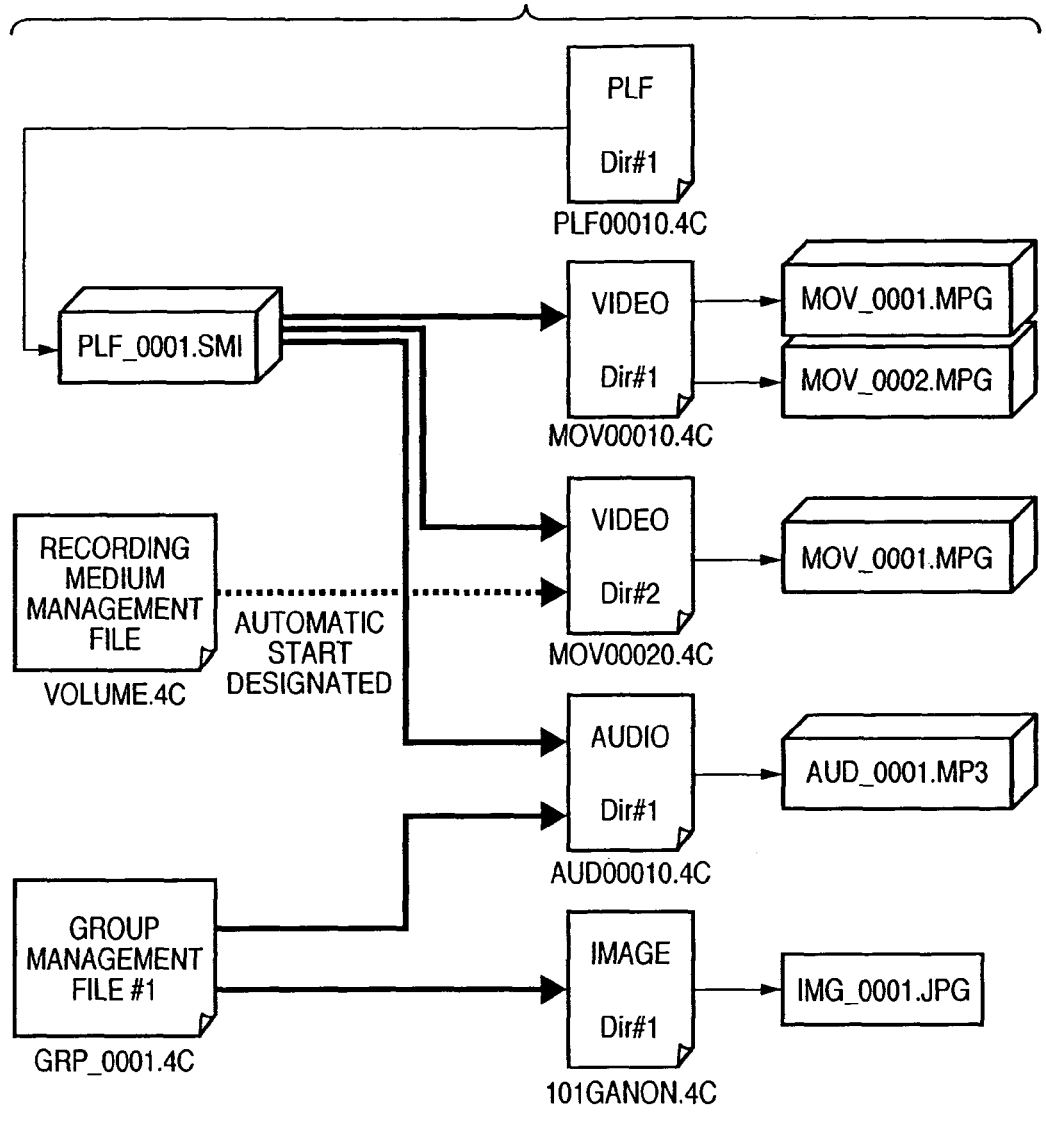
FIG. 6 is a diagram showing the relationship between management files and the play list according to the first embodiment of the present invention.

For example, assume that still image data with an identifier "IMG 0001" is stored in /DCIM/101CANON/101CANON.4C. A link to this file is described by '/DCIM/101CANON/101CANON.4C#fxpointer(//[@id="IMG_0001"])'. FIG. 5 shows a description example of the play list. FIG. 6 shows the link relationship between management files and play list of FIG. 5. In FIG. 6, a play list "PLF_0001.SMF" designates two movie files and an audio file to be played. The play list refers to the directory management files of the directories which store the files. These directory management files are also referred to from a recording medium management file "VOLUME.4C" and a group management file "GRP_0001.4C". Only the directory management files directly manage the files themselves.

Upon reproducing in accordance with the play list, a referred entry may have a deleted attribute value=true. As described above, a file as a link destination has been deleted in such case. A process associated with such situation will be described later.

2. Data Processing Method

A method of processing data explained in the above described section 1 (Format of Objective Data) will be described below. A data recording process for storing one or more movie data in one movie directory together will be described first, and a directory management file update process will then be described. Finally, a file compatibility process executed when a file to be reproduced upon reproducing a play list has been lost or has a format which is not supported will be explained.

Data Recording Process

Movie or audio data which satisfy one-directory storage conditions are combined into one group, and data which belong to an identical group are stored in identical directory. In the first embodiment, movie data are subjected to the process in accordance with the identical directory storage conditions.

Figure 7:
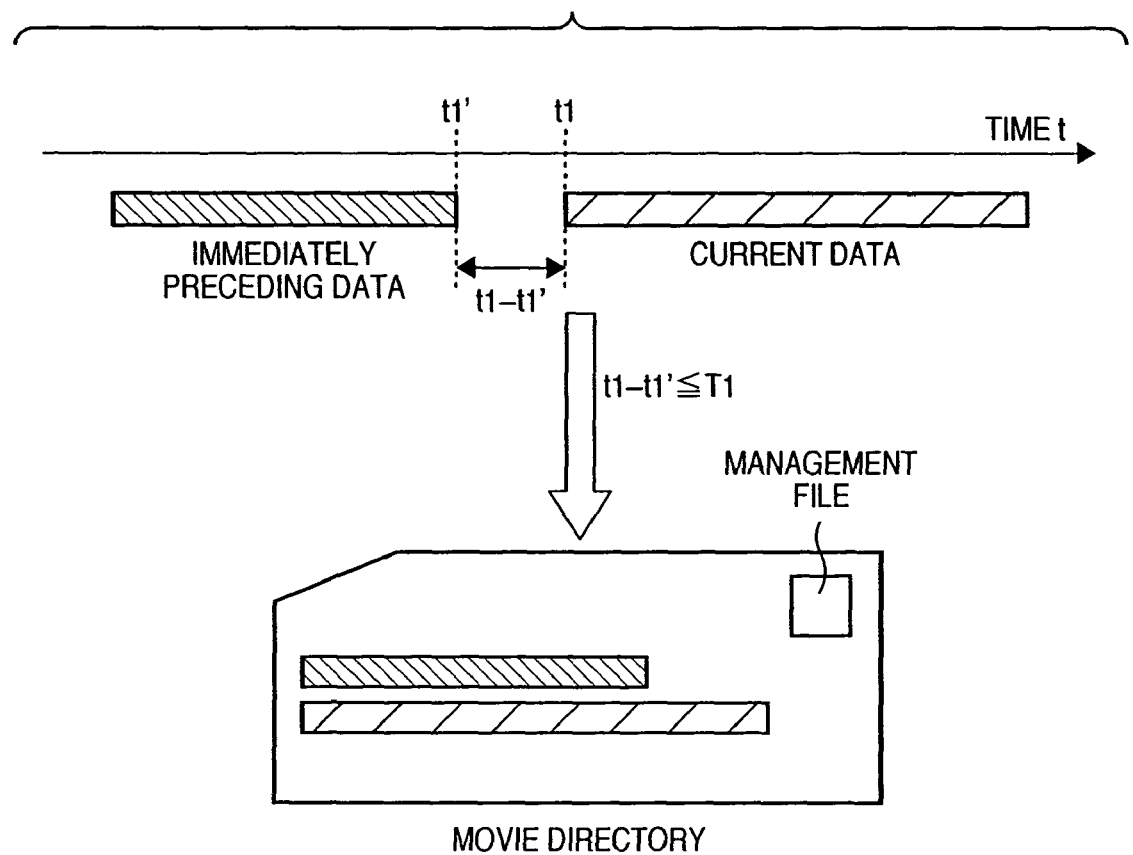
FIG. 7 is a diagram showing the condition for storing movie data in the same directory according to the first embodiment of the present invention.

FIG. 7 shows the one-directory storage conditions in the first embodiment. In the first embodiment, movie data which simultaneously satisfies the following two conditions is stored in the same movie directory as data recorded immediately before the current data, as shown in FIG. 7.

(1) Data to be recorded is continuous data of the same type as data recorded immediately before the current data. That is, the current data and immediately preceding data are two successive movie data or audio data. Still image data are not to be grouped.

(2) A time period from the recording end time of movie data recorded immediately before the data to be recorded to the recording start time of the data to be recorded is T1 or less.

For example, T1=60 min in the first embodiment.

In the first embodiment, when movie data is MPEG2 data, whether it has the PS or TS format is indiscriminate. However, in order to improve the reproduction compatibility, only data with the same format may be grouped. The one-directory storage conditions can appropriately be set and is not limited to the above-mentioned conditions.

Figure 8:
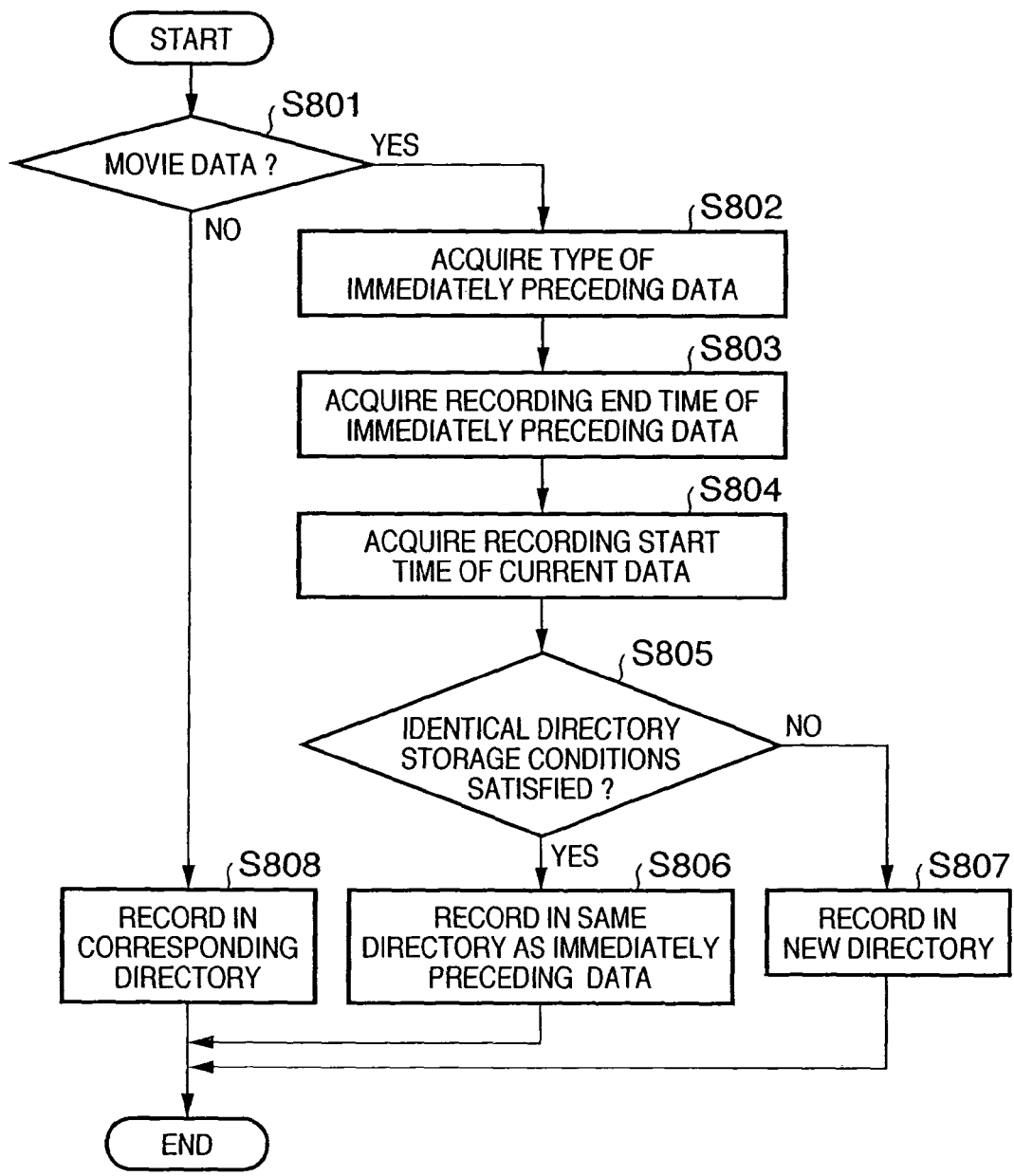
FIG. 8 is a flowchart showing the flow of a movie data grouping process according to the first embodiment of the present invention.

The flow of a grouping process in accordance with the one-directory storage conditions will be described below with reference to FIG. 8.

The type of data to be recorded (to be referred to as "current data" hereinafter) is checked (step S801). If the type is not movie data, the flow advances to step S808. If YES in step S801, the flow advances to step S802.

In step S802, the type of data recorded immediately before the current data (to be referred to as "immediately preceding data" hereinafter) is acquired. In step S803, a recording end time t1' of the immediately preceding data is acquired. In step S804, a recording start time t1 of the current data is acquired. In step S805, it is checked if the identical directory storage conditions are satisfied. That is, it is checked if the immediately preceding data and current data are the same type and $t1-t1' \leq T1$. If the conditions are satisfied, the flow advances to step S806; otherwise, the flow advances to step S807.

In step S806, the current data is recorded in the same movie directory as the immediately preceding data. On the other hand, in step S807, a new movie directory is created, and the current data is recorded in the created directory, thus ending the process.

If the current data is not movie data, i.e., is still image data or the like, data is recorded in the format compatible to DCF in step S808. If the current data is audio data, data is recorded in the audio directory, thus ending the process.

Upon recording movie data, a thumbnail image may be recorded in the movie directory. In this case, since still image data is recorded in the DCF compatible format, a thumbnail image of movie data preferably adopts a DCF thumbnail file format. A thumbnail file may be generated after data recording, or thumbnail data may be generated and recorded immediately after the first frame is recorded.

Directory Management Information Update Process

In the first embodiment, a directory management information update process is executed upon recording and deleting files and upon registering files in the group management file or play list.

When a new file is recorded, a new entry is created in the management information of a directory corresponding to the new file, and the new file is registered in that file. Upon registering the file, identification information and a file name are appended using id and src attributes, and when the file to be registered is a movie or audio file, its reproduction duration is appended using a dur attribute.

Figure 9:
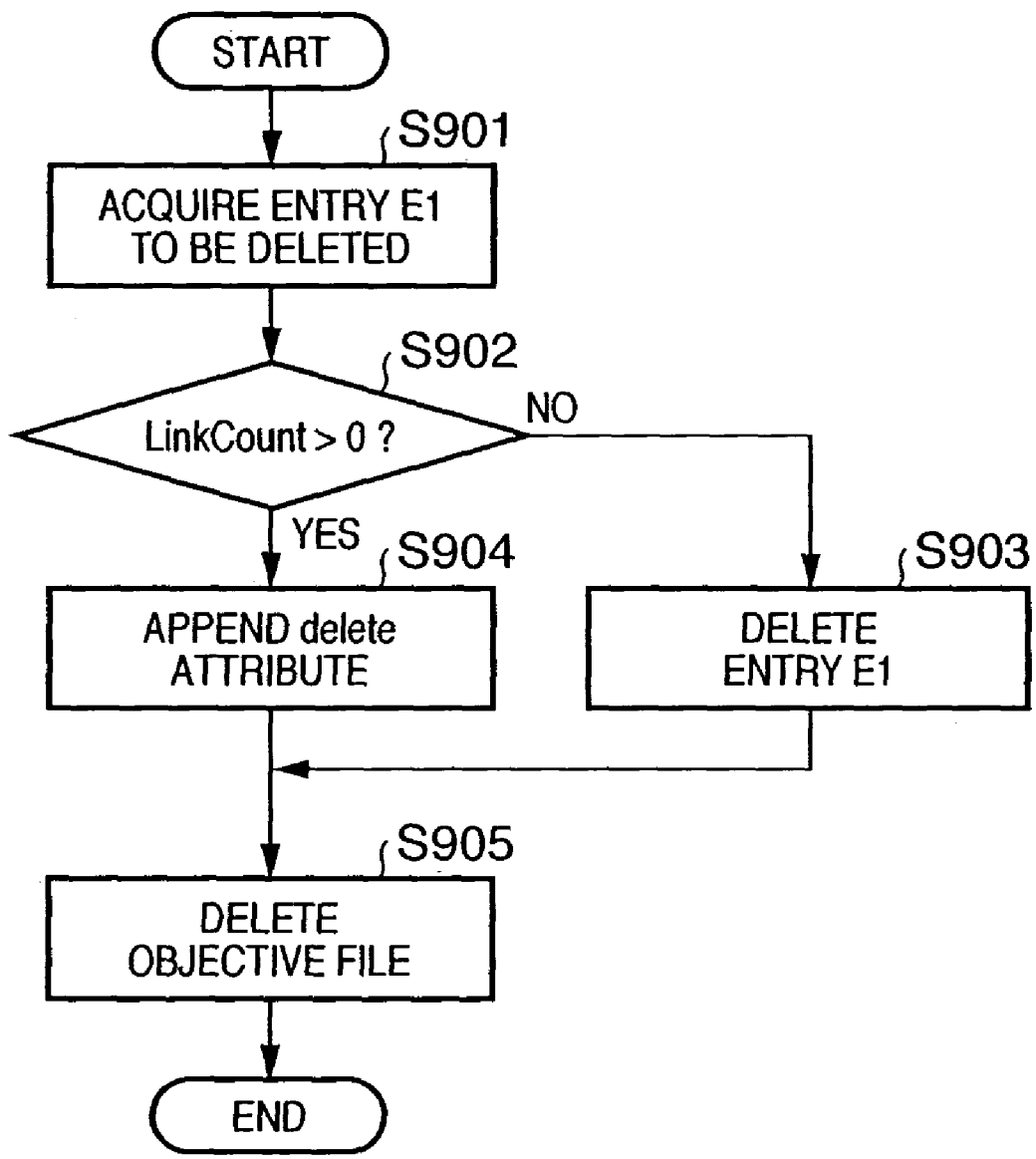
FIG. 9 is a flowchart showing the flow of a directory management file update process in deleting a file according to the first embodiment of the present invention.

When a file is deleted, the process varies depending on the number of links held as the SYSTEM_linkCount attribute value, USER_linkCount attribute value, or PLF_linkCount attribute value. FIG. 9 shows the flow of the management information update process when a file other than a PLF is deleted.

In step S901, entry E1 of a file to be deleted is acquired. If the linkCount attribute value of acquired entry E1 is zero or no linkCount attribute value is found (NO in step S902), the flow advances to step S903; otherwise (YES in step S902), the flow advances to step S904.

In step S903, entry E1 is deleted from the management file, and the flow advances to step S905. On the other hand, in step S904, a deleted attribute (deletion attribute) is appended to entry E1, and a deleted attribute value is set to be true. After the process in step S903 or S904, the flow advances to step S905.

In step S905, the objective file is deleted, thus ending the process.

When a new file is registered in the play list, the following process is executed. First, entry E2 of a file to be registered is acquired. Then, the corresponding linkCount attribute value of entry E2 is incremented by one. For example, if the file is registered in the play list, the PLF_linkCount attribute value is incremented by one. If the file is registered in the group management file for groups automatically created by the system, the SYSTEM_linkCount attribute value is incremented by one. If the file is registered in the group management file for groups created by the user, the USER_linkCount attribute value is incremented by one. If no linkCount attribute value is found, a corresponding linkCount attribute is appended. In this case, the attribute value is "1".

Figure 10:
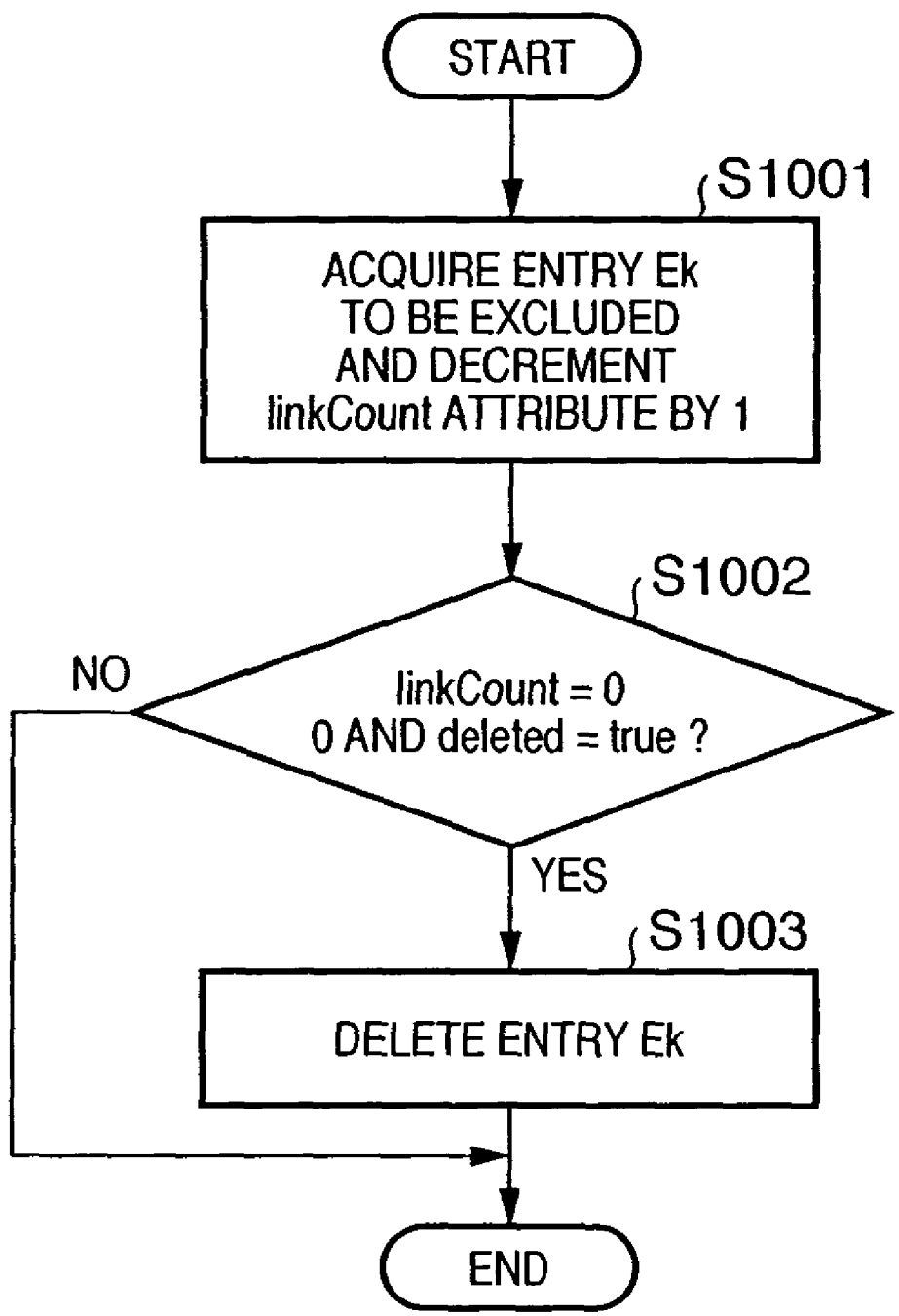
FIG. 10 is a flowchart showing the flow of a directory management file update process in excluding a file according to the first embodiment of the present invention.

When a media object is excluded from the play list or the group management file, a process shown in FIG. 10 is performed for entry Ek corresponding to the file to be excluded.

In step S1001, Entry Ek to be excluded is acquired, and the corresponding linkCount attribute value is decremented by one.

Then, if each of the PLF_linkCount attribute value and USER_linkCount attribute value is equal to zero, and the deleted attribute value of entry Ek is true (YES in step S1002), entry Ek is deleted in step S1003, thus ending the process. Otherwise (NO in step S1002), the process ends without deleting the entry Ek.

When PLF or the group management file is deleted, a process shown in FIG. 10 is performed for entries Ek of all the files registered in the play list or group management file to be deleted, in addition to the file deletion process shown in FIG. 9.

With this process, the identification name of an entry, all links to which are canceled, and which has no entity (file), can be reused. If, e.g., a file name is formed by a combination of a prefix and a numerical value, reuse of the identification name can avoid a shortage of available file names due to repetition of file removal. Further, in a system using file indirect referencing, a file having the same name as an old file may have an entity different from the old one. According to a management method of the present invention, such circumstances can be handled appropriately.

By executing the management information update process in this way, the number of links from the play list, group management files, or recording medium management file to respective files can be managed for each file. By appending a deletion attribute to a file in the management file, reuse of the identification name (id) of the file which is referred to yet from the play list even after the file itself is deleted can be suppressed, and deletion of the file can be recognized from all the play lists and management files which refer to the deleted file.

File Compatibility Process

In the first embodiment, during the reproduction process using the play list or upon scheduling before reproduction, when it is determined that an entry of a file designated by the play list includes a deleted attribute, or when data to be reproduced has a data format which is not supported, a screen display is frozen for the same duration as the reproduction duration of that file. However, this process is applied only when an objective file is still image data or movie data. If an objective file is audio data, that data is not reproduced.

Figure 11:
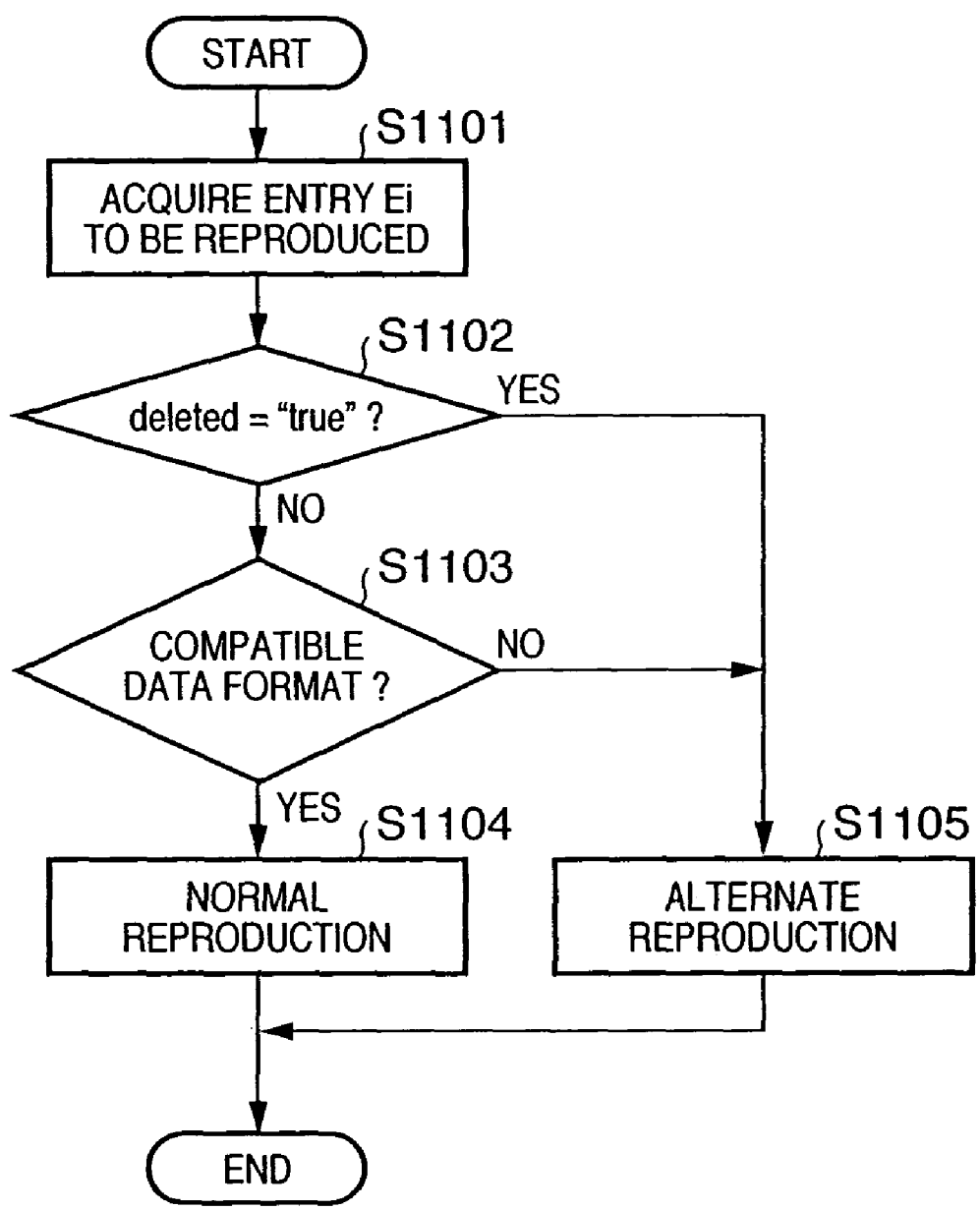
FIG. 11 is a flowchart showing the flow of a file compatibility process according to the first embodiment of the present invention.

FIG. 11 shows the flow of the file compatibility process.

In step S1101, entry Ei of each file to be reproduced is acquired. If the deleted attribute value of the acquired entry Ei is true, the flow advances to step S1105; otherwise (NO in step S1102), the flow advances to step S1103.

In step S1103, a file designated by the src attribute value in entry Ei is opened, and the data format is checked. If the data format is not supported by the reproducing apparatus, the flow advances to step S1105; otherwise, the flow advances to step S1104. In step S1104, it is determined to normally reproduce the file to be reproduced, thus ending the process.

On the other hand, in step S1105, if the type of file is movie, image, or playlist, alternate reproduction is performed, thus ending the process. If the type of file is audio, reproduction is canceled.

In the file compatibility process according to the first embodiment, when a file to be reproduced is data with a format incompatible to the reproducing apparatus or when the file is not present, a non-reproduction duration equal to the reproduction duration of this file is assured. With this operation, the reproduction process can be executed without adversely affecting the reproduction timings of other files.

Instead of assuring the non-reproduction duration, a warning dialog "incompatible file format", "no file is found", or the like may be displayed.

As described above, in the first embodiment, files themselves are managed on a directory-by-directory basis. Instead of grouping or direct referencing of a file name from a reproduction control script or the like, a scheme is introduced to refer to a corresponding directory management file. This makes it possible to localize the file management cost and greatly reduce the management cost of the entire complicated system having functions such as grouping, a reproduction control script, and the like.

Second Embodiment

In the first embodiment, linkage between management information and a play list has been described. The second embodiment will describe a process upon editing a play list.

Figure 12:
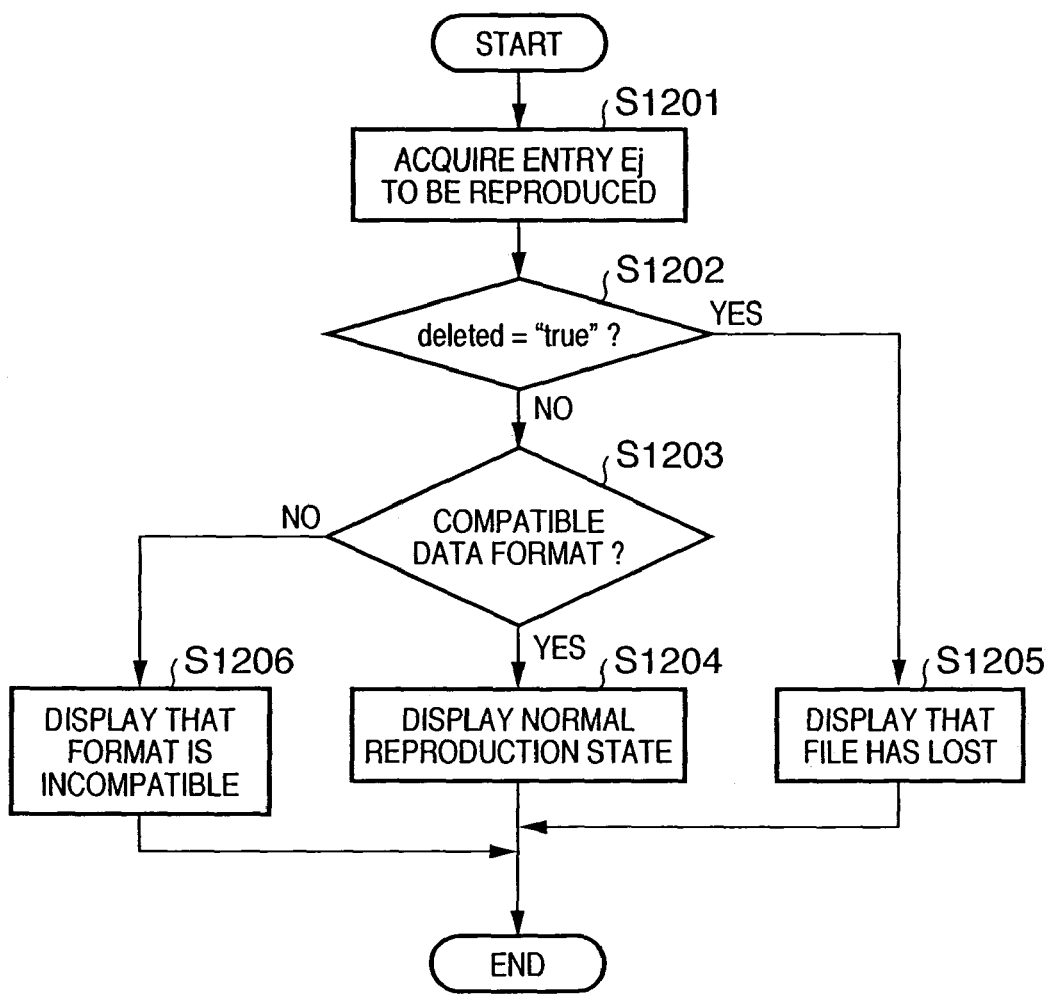
FIG. 12 is a flowchart showing the flow of a pre-process of PLF editing according to a second embodiment of the present invention.

In some cases, a file designated by a play list to be edited may be not present, or may have an incompatible data format. Even in such case, the information of the reproduction timings of all files can be acquired in the same manner as in the file compatibility process. FIG. 12 shows an example of the pre-process of editing of a play list according to the second embodiment.

The following process is performed for files Fj registered in a play list to be edited.

In step S1201, entry Ej of each file Fj to be processed is acquired. If a deleted attribute value in the acquired entry is true (YES in step S1202), the flow advances to step S1205; otherwise (NO in step S1202), the flow advances to step S1203.

In step S1203, a file designated by the src attribute value in entry Ej is opened, and the data format is checked. If the data format is incompatible to a recording/reproducing apparatus (NO in step S1203), the flow advances to step S1206; otherwise (YES in step S1203), the flow advances to step S1204.

In step S1204, it is determined to output a display indicating that the file to be reproduced can be normally reproduced, thus ending the process.

In step S1205, it is determined to output a display indicating that the file to be reproduced has lost, thus ending the process.

In step S1206, it is determined to output a display indicating that the file to be reproduced has the incompatible data format, thus ending the process.

Figure 13:
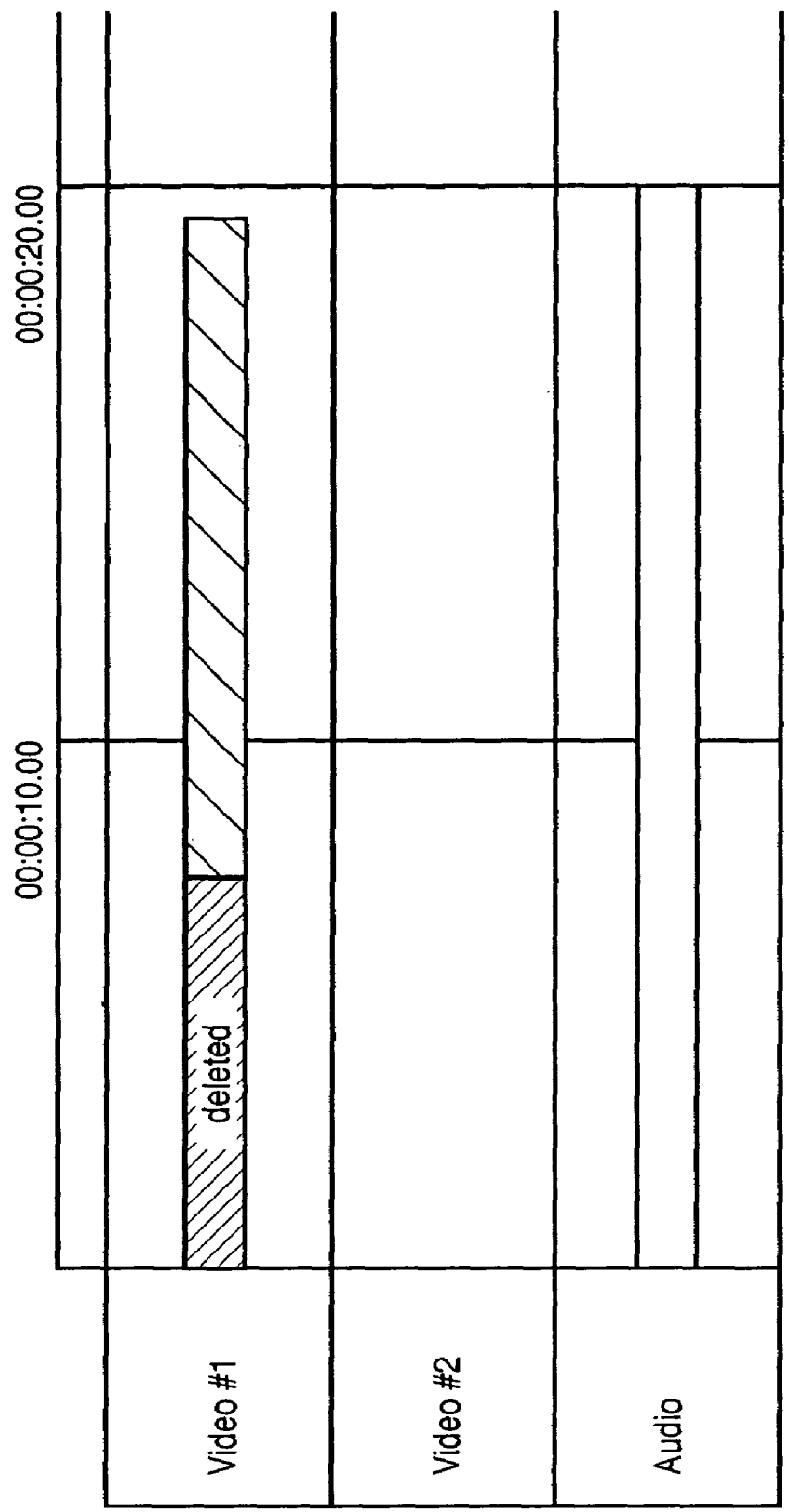
FIG. 13 shows an example of a PLF edit GUI according to the second embodiment of the present invention.

Use of the process as shown in FIG. 12 makes it possible to output a display as shown in FIG. 13 and present to an edit operator the status of each file. FIG. 13 shows an example of a method of indicating that the first movie file in a Video#1 track has lost.

In this way, each file is managed by a corresponding directory management file, and the length corresponding to the reproduction duration of that file is held in the directory management file. This makes it possible to reproduce a reproduction control script with consideration for the reproduction duration for nonreproducible data.

The above-mentioned first and second embodiments have described the linkage between directory management files and play lists. The present invention, however, is not limited to play lists. The present invention can be applied to arbitrary file management which involves reference to media data.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. A recording apparatus that stores a plurality of object files each containing object data in a plurality of directories and records the plurality of object files on a recording medium, comprising:

a management information processing unit that generates a plurality of directory management files respectively for each directory of the plurality of directories, wherein each of the plurality of directories store object files of the plurality of object files, and wherein each directory management file contains file names of the plurality of object files stored in a corresponding directory of the plurality of directories and identification attributes having different values for identifying the object files stored in the corresponding directory, wherein said management information processing unit classifies the plurality of object files into a plurality of groups including one group where a first object file stored in a first directory and a second object file stored in a second directory different from the first directory are grouped, and generates group management files for specifying the object files in a corresponding group of the plurality of groups without directly specifying file names of the object files in the corresponding group, wherein the group management files are different from the directory management files, and wherein each of the group management files contains group ID information of the corresponding group and entries including file names of the directory management files for the plurality of different directories respectively storing the object files in the corresponding group and the values of identification attributes of the object files in the corresponding group contained in the directory management files, the group management file for the one group containing the group ID information of the one group, a first entry including a file name of a first directory management file for the first directory and a value of the identification attribute of the first object file contained in the first directory management file, and a second entry including a file name of a second directory management file for the second directory and a value of the identification attribute of the second object file contained in the second directory management file; and a recording unit that records the plurality of directory management files and group management files including the group management file for the one group on the recording medium.

2. The apparatus according to claim 1, wherein each directory management file is described in a data description language.

3. The apparatus according to claim 1, wherein each of the group management files is described in a data description language.

4. The apparatus according to claim 1, wherein each of the group management files designates the corresponding object files in an XPath/XPointer format.

5. A recording apparatus that stores a plurality of object files each containing object data in a plurality of directories and records the plurality of object files on a recording medium, comprising:

a management information processing unit that generates a plurality of directory management files respectively for each directory of the plurality of directories, wherein each of the plurality of directories store object files of the plurality of object files, and wherein each directory management file contains file names of the object files stored in a corresponding directory of the plurality of directories and identification attributes having different values for identifying the object files stored in the corresponding directory, wherein said management information processing unit classifies the plurality of object files into a plurality of groups including one group where a first object file stored in a first directory and a second object file stored in a second directory different from the first directory are grouped, and generates group management files for specifying the object files in a corresponding group of the plurality of groups without directly specifying file names of the object files in the corresponding group, wherein the group management files are different from the directory management files, and wherein each of the group management files contains group ID information of the corresponding group and entries including file names of the directory management files for the plurality of different directories respectively storing the object files in the corresponding group and the values of identification attributes of the object files in the corresponding group contained in the directory management files, the group management file for the one group containing the group ID information of the one group, a first entry including a file name of a first directory management file for the first directory and a value of the identification attribute of the first object file contained in the first directory management file, and a second entry including a file name of a second directory management file for the second directory and a value of the identification attribute of the second object file contained in the second directory management file; and a recording unit that stores the plurality of directory management files respectively in the directory where the object files identified by the identification information included in the corresponding directory management file are stored and records the plurality of directory management files and group management files including the group management file for the one group on the recording medium.

6. A recording method of storing a plurality of object files each containing object data in a plurality of directories and recording the plurality of object files on a recording medium, comprising:

generating a plurality of directory management files respectively for each directory of the plurality of directories, wherein each of the plurality of directories store object files of the plurality of object files, and wherein each directory management file contains file names of the object files stored in a corresponding directory of the plurality of directories and identification attributes having different values for identifying the object files stored in the corresponding directory;

classifying the plurality of object files into a plurality of groups including one group where a first object file stored in a first directory and a second object file stored in a second directory different from the first directory are grouped;

generating group management files for specifying the object files in a corresponding group of the plurality of groups without directly specifying file names of the object files in the corresponding group, wherein the group management files are different from the directory management files, and wherein each of the group management files contains group ID information of the corresponding group and entries including file names of the directory management files for the plurality of different directories respectively storing the object files in the corresponding group and the values of identification attributes of the object files in the corresponding group contained in the directory management files, the group management file for the one group containing the group ID information of the one group, a first entry including a file name of a first directory management file for the first directory and a value of the identification attribute of the first object file contained in the first directory management file, and a second entry including a file name of a second directory management file for the second directory and a value of the identification attribute of the second object file contained in the second directory management file; and recording the plurality of directory management files and group management files including the group management file for the one group on the recording medium.

7. A recording method of storing a plurality of object files each containing object data in a plurality of directories and recording the plurality of object files on a recording medium, comprising:

generating a plurality of directory management files respectively for each directory of the plurality of directories, wherein each of the plurality of directories store object files of the plurality of object files, and wherein each directory management file contains file names of the object files stored in a corresponding directory of the plurality of directories and identification attributes having different values for identifying the object files stored in the corresponding directory;

classifying the plurality of object files into a plurality of groups including one group where a first object file stored in a first directory and a second object file stored in a second directory different from the first directory are grouped;

generating group management files for specifying the object files in a corresponding group of the plurality of groups without directly specifying file names of the object files in the corresponding group, wherein the group management files are different from the directory management files, and wherein each of the group management files contains group ID information of the corresponding group and entries including file names of the directory management files for the plurality of different directories respectively storing the object files in the corresponding group and the values of identification attributes of the object files in the corresponding group contained in the directory management files, the group management file for the one group containing the group ID information of the one group, a first entry including a file name of a first directory management file for the first directory and a value of the identification attribute of the first object file contained in the first directory management file, and a second entry including a file name of a second directory management file for the second directory and a value of the identification attribute of the second object file contained in the second directory management file; and storing the plurality of directory management files respectively in the directory where the object files identified by the identification information included in the corresponding directory management file are stored and recording the plurality of directory management files and group management files including the group management file for the one group on the recording medium.

\* \* \* \* \*